May 7, 1957   J. MERCIER ET AL   2,791,095
FLUID MOTOR SYSTEM FOR HATCH COVER ASSEMBLY
Filed July 20, 1954   5 Sheets-Sheet 5

Fig. 11.

INVENTOR
Jean Mercier
Jacques H. Mercier
BY
Dean Fairbank & Hirsch
ATTORNEYS

United States Patent Office 2,791,095
Patented May 7, 1957

2,791,095

FLUID MOTOR SYSTEM FOR HATCH COVER ASSEMBLY

Jean Mercier and Jacques H. Mercier, New York, N. Y.

Application July 20, 1954, Serial No. 444,522

1 Claim. (Cl. 60—97)

This invention relates to the art of hatch covers and more particularly to the means for breaking the water-tight seal between the hatch cover and the coaming on which it rests, prior to opening of the hatchway.

Where a hatchway is closed by means of a plurality of pivotally connected panels, provided with resilient seals which engage a sealing strip around the hatchway to ensure water-tight security, if when the panels are moved from closed to open position or vice versa, any portion of the resilient seal rubs against the sealing strip, the resultant friction will cause breakdown of the seal, thereby permitting leakage of water into the hatchway at the point of friction.

It is accordingly among the objects of the invention to provide a hatch cover assembly for a hatchway, that is relatively simple in construction, having but few parts that are not likely to become out of order, that provides water-tight security when the hatch covers are in closed position, and may readily be operated by even unskilled personnel to open and close the hatchway with assurance that during the opening and closing operations, no injury will be imparted to any portion of the resilient seal effecting such water-tight security.

According to the invention from its broader aspect, the hatchway of a ship is closed by means of at least a pair of panels hinged together at adjacent longitudinal edges with the free longitudinal edge of one of the panels being pivotally mounted at one end of the hatchway on a support fixed with respect thereto. The panels when in closed position are in substantially the same horizontal plane, with the ends of the panels resting on a supporting strip rigidly fixed with respect to the periphery of the hatchway and the panels are designed to be folded together about their hinge connection for movement to open position.

To provide water-tight security between the panels and the hatchway, the panels are provided with resilient seals along their peripheries which rest on the supporting strip when they are in closed position and to prevent injury to the resilient seals, means are provided to move the seals away from the supporting strip, prior to opening of the panels and to retain such seals out of engagement with the supporting strip throughout the entire opening operation as well as throughout the entire closing opening, until the panels have reached fully closed position.

In the accompanying drawings in which are shown one or more of various possible embodiments of the several features of the invention, Fig. 1 is a longitudinal sectional view of a hatch cover assembly in closed position, Fig. 2 is a fragmentary detail view on a greatly enlarged scale of the seal breaking mechanism with the hatch covers in closed position, Fig. 2-a is a perspective view of a typical hinge used with the assembly, Fig. 2-b is a view of a reaction plate.

Figures 1, 2, 2A, 2B:
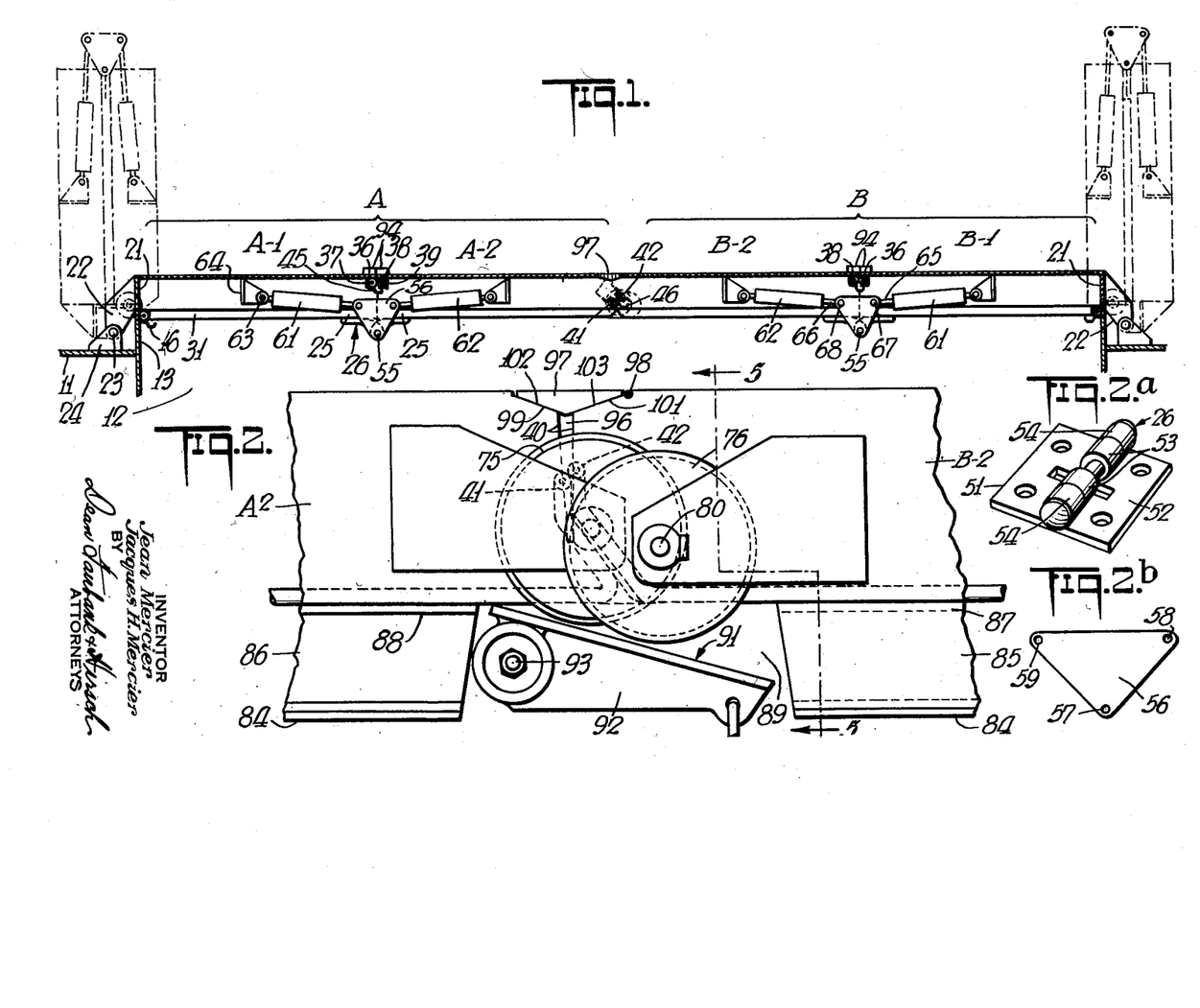
Figure 5:
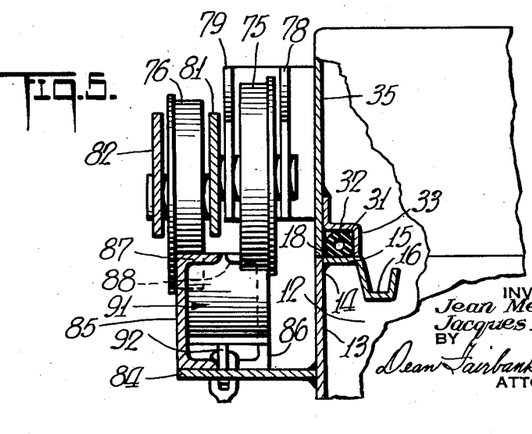
Fig. 5 is a sectional view taken along line 5—5 of Fig. 2.
Figure 6:
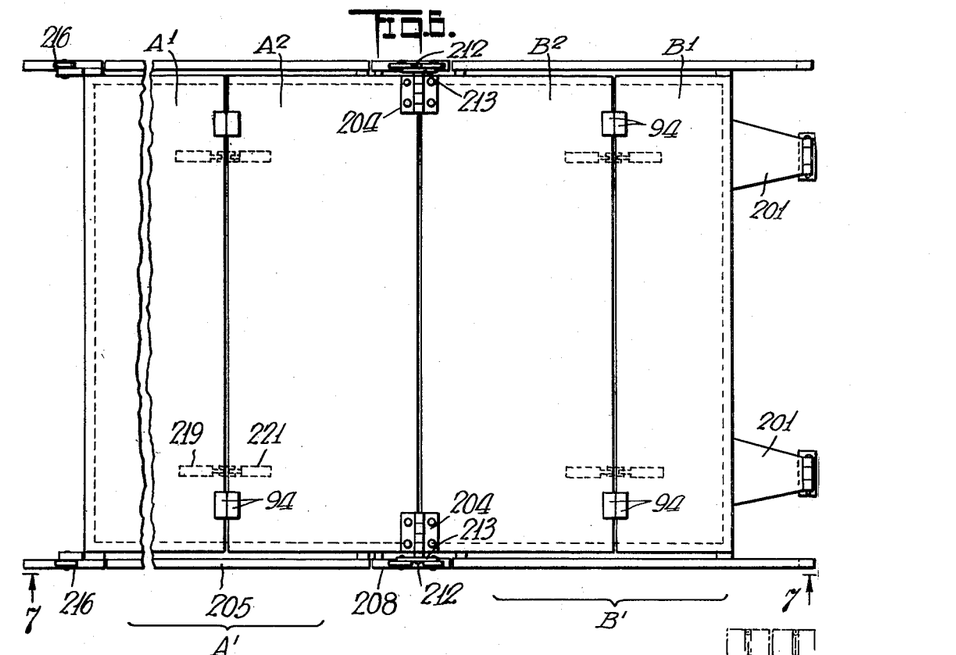
Fig. 6 is a top plan view of another type of hatch cover assembly.

Referring now to Figs. 1 and 5 of the drawings, in the illustrative embodiment shown, the deck 11 of a ship has a conventional hatchway 12 having a rectangular coaming 13 rising therefrom which serve to support the hatch covers in the manner to be described so that a water-tight seal will be effected. Affixed to the upper edge 14 of the coaming and extending inwardly therefrom is a rectangular supporting strip 15 conformed as a trough 16 along its inner edge.

In the embodiment shown in Figs. 1 to 5, the hatchway is designed to be closed by two pairs of substantially rectangular hatch covers A and B, each having two panels A-1, A-2 and B-1, B-2, respectively. The panels are of sufficient length that they may extend transversely across the hatchway with the ends 18 (Fig. 5) of each panel resting on the strips 15 on opposed sides of the coaming 13.

As shown in Fig. 1, the outer longitudinal edges 21 of each of the panels A-1, B-1 mounts a plurality of brackets 22 which extend laterally from the longitudinal edges 21. The end of each of the brackets 22 is pivotally connected, as at 23, to the top of an associated upright standard 24 affixed to the deck of the ship adjacent the coaming 13. The adjacent lower edges 25 of the panels of each pair of covers are connected as by means of hinges 26, so that each pair of panels may be moved from the closed position shown in full lines in Fig. 1 to the open position shown in broken lines.

In order to prevent leakage of water into the hatchway, a continuous sealing strip 31, preferably of resilient material such as rubber and desirably having a continuous bore 32 therethrough, is affixed to the periphery of each of the panels by means of a bracket 33. As shown in Figs. 1 and 5, the sealing strip 31 on the panels A-1 and B-1 is positioned adjacent the lower edge 18 of each of said panels along their longitudinal edges 21 and their end edges 35, and then rises so that it will extend along the inner longitudinal edges 36 of said panels adjacent the top thereof as at 37. The sealing strip 31 on the panels A-2 and B-2 extends along the inner longitudinal edges 38 of said panels adjacent the top thereof, as at 39, so as to lie in juxtaposition to the adjacent portion 37 of the sealing strip on the associated panels A-1 and B-1. The sealing strip 31 on panels A-2 and B-2 then extends along the ends of said panels adjacent their lower edges 18, and along the outer longitudinal edges 40 of said panels slightly above their lower edges 18. The portion 41 of strip 31 on panel A-2 lies in a plane slightly below that of the portion 42 of strip 31 on panel B-2 so that the adjacent portions of the strips will engage to provide a dependable seal.

The portions of the sealing strips 31 adjacent the lower edge 18 of the panels, in normal condition extends beyond said edges 18. When said edge 18 seats on strip 15, as shown in Fig. 5, the sealing strip 31 will be compressed to form a dependable seal against strip 15 to provide water-tight security, yet excessive compression is prevented by reason of the abutment of edge 18 against the strip 15.

The gutter 16 will collect any liquid that may leak past the portion of sealing strip 31 adjacent edge 18 of the panels and gutters 45 and 46 are associated with the abutting portions 37, 39 and 41, 42 of the strips 31 to collect liquid that may leak therepast.

Although the respective pairs of panels may be moved to the open position shown in broken lines in Fig. 1, in any suitable manner, it is preferred to use the mechanism shown in Patent No. 2,491,261, dated December 13, 1949.

As the mechanism to actuate each of the pairs of covers is identical, only that associated with the cover A will be described in detail. The hinge 26 connecting the adjacent lower edges 25 of the panels A–1 and A–2 has two hinge plates 51, 52 (Fig 2–a) which are suitably affixed to the panels.

The hinges 26 may be of the type having two spaced fingers 53 on the hinge plate affixed to one of the panels, i. e. panel A–1, straddled by two spaced fingers 54 on the hinge plate affixed to the other panel, with a pintle or pin 55 extending through such fingers in conventional manner. The central finger which is generally provided to fit between the two spaced fingers 53 of the first hinge plate is desirably eliminated in the present construction and in its place a reaction member, preferably a plate 56 is provided.

The plate 56 (Fig. 2–b) may be substantially triangular in shape and has an opening 57, 58 and 59 at each of its corners and is desirably positioned in a vertical plane with one of its corners between the two spaced fingers 53 of the first hinge plate so that the pin 55 extends freely through the opening 57.

Means are provided coacting with the reaction plate 56 to move the panels A–1 and A–2 from the closed position shown in Fig. 1, in which they lie in side by side relationship in a horizontal plane, to open position, as shown in broken lines in Fig. 1, in which they extend substantially parallel to each other in a vertical plane.

Figure 10:
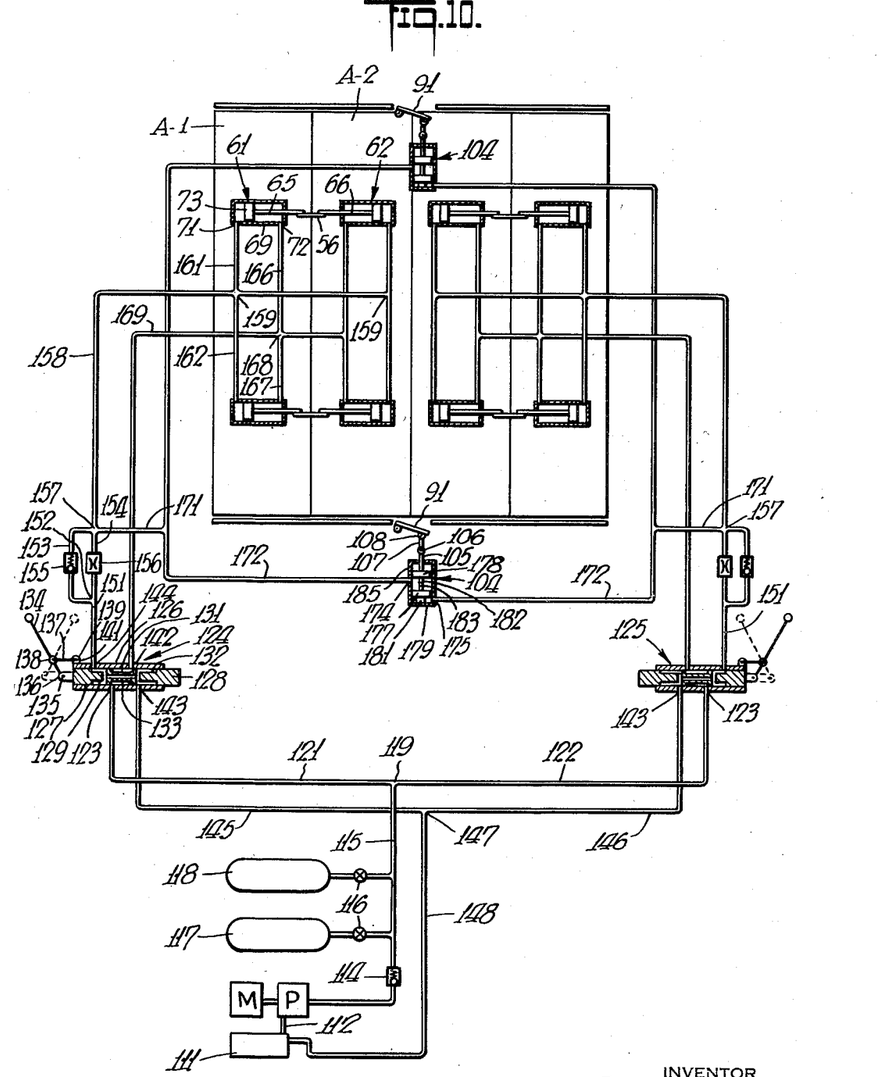
Fig. 10 is a diagrammatic view of a hydraulic pressure system for use with the hatch cover assembly.

To this end, as shown in Figs. 1 and 10, a pair of opposed actuating means are provided, illustratively hydraulic units 61 and 62 mounted respectively in panels A–1 and A–2. Although the opposed units 61, 62 may be mounted in any suitable manner, the rear end of each of the units is desirably pivotally mounted as at 63 to a beam 64 extending longitudinally of the associated panel, approximately midway between its side edges. The outer ends of the reciprocable plungers 65, 66 of the units 61, 62, respectively, are pivotally connected to the reaction plate 56 by means of pins 67, 68 extending through the outer end of the plungers and the openings 58 and 59, respectively. The hydraulic units 61 and 62 are illustratively of the double acting type and each has a cylinder 69 with a control port 71, 72 at each end on each side of the piston 73 slidably mounted in the cylinder.

To facilitate movement of the panels from closed to open position and vice versa, in the manner hereinafter to be described, the panels A–2 and B–2 at each end adjacent their longitudinal edges 40 mount rollers 75 and 76, respectively, which are of the same diameter as is clearly shown in Figs. 2 to 5 inclusive. The roller 75 is mounted on an axle 77 which extends between a pair of spaced parallel arms 78 and 79 carried by the panel A–2 adjacent its longitudinal edge 40. As is clearly shown in Fig. 4, the arms 78 and 79 extend beyond the edge 40 of panel A–2 up to nearly the longitudinal edge 40 of panel B–2. The roller 76 is also mounted on an axle 80 which extends between a pair of spaced parallel arms 81 and 82 which are carried by the panel B–2 adjacent its longitudinal edge 40. The arms 81 and 82 are spaced further from the ends of the panels than are the arms 78 and 79 so that the roller 76 will also be spaced further from the ends of the panel than roller 75. In addition, the arms 78, 79 and 81, 82 are so positioned, as is clearly shown in Figs. 2 and 5 that when the panels A–2 and B–2 are seated on the coaming strip 15, the axle 80 of the roller 76 will be at a lower level than the axle 77 of the roller 75.

As shown in Fig. 5, a supporting strip 84 is affixed to the coaming 13 on the outer surface thereof and extends along substantially the entire length thereof on each of its opposed sides. Each of the strips 18 mounts a pair of substantially U-shaped channel members 85, 86 affixed at their lower edges to the supporting strip 84 and defining tracks 87, 88 along their upper edge. As is clearly shown in Figs. 4 and 5, the tracks 87 and 88 are displaced laterally with respect to each other so that the track 87 will be aligned with the roller 76 and the track 88 will be aligned with the roller 75. The adjacent inner ends of the tracks 87 and 88 are spaced as at 89 to define a recess in which the bottommost portion of the peripheries of the rollers 75 and 76 may be positioned when the panels are in the closed position shown.

Inasmuch as the portion of the resilient seals 31 at the lower edges 18 of the panels are pressed with considerable force against the strips 15 when the panels are in the closed position shown in Fig. 1, if the panels should be moved toward the open position shown in broken lines in Fig. 1, without first moving the sealing strips 31 away from strip 15, as the panels A–2 and B–2 move toward closed position, the portions of the sealing strips that rubbed against strip 15 would rapidly wear and break down so that no dependable seal would be provided. Such rubbing action would be especially severe at the portions of the sealing strips 31 adjacent the longitudinal edge 40 of panel A–2, B–2.

To eliminate such wear, means are provided on each of the opposed sides of the coaming to raise the sealing strips 31 from the strip 15. Such means desirably comprises a track section 91 desirably of width equal to the width of the two tracks 87 and 88 so that both of the rollers 75 and 76 may rest thereon. The track section 91 may comprise a plate having a depending flange 92 pivotally mounted at one end to the coaming as at 93, in the recess 89 between the adjacent ends of the tracks 85, 86 and of length sustantially equal to the length of said recess.

As shown in Fig. 1, in normal position, the track section 91 is inclined downwardly from its pivotal mount 93. As the rollers 76 and 75 are at different levels, as previously described, and as the roller 76 is more remote from the pivot 93 than the roller 75, if the track section 91 is pivoted in a counterclockwise direction, the edge 40 of panel B–2 will be lifted a greater amount than the edge 40 of panel A–2, as is clearly shown in Fig. 3. To permit such movement of the panels, sufficient clearance is desirably provided therebetween as at 96, and the space 96 is covered by a strip 97 pivoted at one edge as at 98 to the panel B–2 and extending the entire length of the latter and also extending laterally over the space 96. In order that the panel A–2 will not jam against the strip 97 when it is moved to closed position, the adjacent edges of panels A–2 and B–2 at their top portions are inclined downwardly as at 99 and 101, and the undersurface of the strip 97 is correspondingly conformed as at 102, 103.

In order that upward movement of the end 40 of each pair of panels also raises the rest of the panels of each pair, a pair of abutment blocks 94 are affixed to the top surface of each pair of panels adjacent their edges 36, 38, as shown in Fig. 1.

Figure 3:
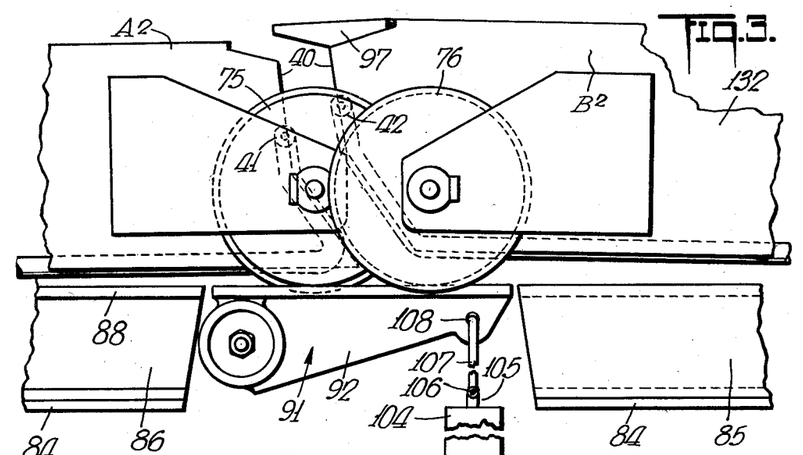
Fig. 3 is a view similar to Fig. 2 with the seal broken, prior to opening of the hatchway.
Figure 4:
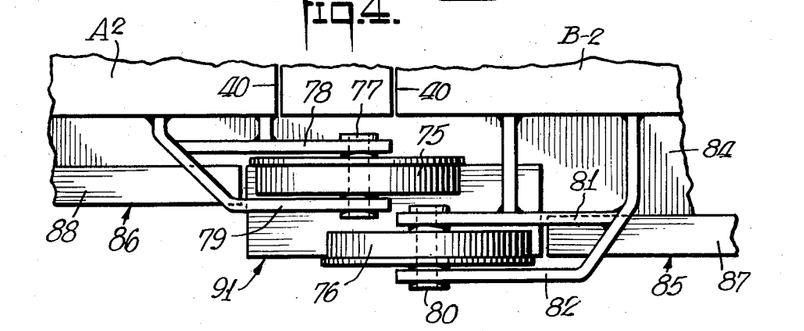
Fig. 4 is a top plan view of the seal breaking mechanism.

The pivoted track section is actuated, in the illustrative embodiment herein shown, by means of a hydraulic unit 104, which, as shown in Fig. 3, has a piston rod 105 extending therefrom, pivotally connected as at 106 to one end of a link 107, the other end of which is pivotally connected to the free end of the rail section as at 108.

In order to insure that the pivoted track section 91 will first be actuated to space the seal 31 from the strip 15 before movement of the hatch cover panels from closed to open position, the fluid pressure system shown in Fig. 10 is desirably provided.

The fluid pressure system comprises a reservoir 111 connected by line 112 to a pump P driven by a motor M. The outlet of pump P is connected through a one-way check valve 114 to a supply line 115. Connected to the supply line 115 through manually operated valves 116 are pressure accumulators 117, 118, such as for example, the "Olaer" accumulator manufactured by Greer Hydraulics, Inc. of New York City. The accumulator 117, for example, may be the reserve accumulator and the accumulator 118 normally used to actuate the system.

The supply line 115 is connected to a junction 119 which has two branch lines 121 and 122 connected to the inlet ports 123 of identical three-way selector valves 124 and 125, each having a neutral and an open and closed position. Each of the selector valves desirably comprises a casing 126 having a cylindrical bore 127 in which a plunger 128 is slidably mounted. The plunger has three peripheral annular grooves 129, 131 and 132 and has a passageway 133 therein providing communication between annular grooves 129 and 132.

Although the plunger may be actuated in any suitable manner, in the illustrative embodiment herein shown, a handle or lever 134 is pivotally mounted at one end as at 135 to the free end of a finger 136 affixed to the plunger 128 and extending longitudinally therefrom. A link 137 is pivotally connected at one end as at 138 to the lever 134 adjacent its pivoted end and is pivotally connected at its other end as at 139 to a finger 141 affixed to the casing 126.

In the closed position shown of the selector valves, the port 123 is in communication with annular groove 131, as is the control port 142 of the valve. The annular groove 132 is in communication with a discharge port 143 and the annular groove 129 is in communication with a control port 144. In the neutral position of the selector valves, the control port 142 is in communication with discharge port 143 through annular groove 132 and the control port 144 is also in communication with discharge port 143 through annular groove 129, passageway 133 and annular groove 132. The port 123 is only in communication with annular groove 131 and hence will be sealed. In the open position of the selector valves, the port 123 is in communication with control port 144 through annular groove 131 and the control port 142 is in communication with discharge port 143, through annular groove 132.

The discharge ports 143 of both selector valves 124 and 125 are connected to branch return lines 145 and 146 which lead to junction 147 which is connected by main return line 148 to the reservoir 111.

Each of the control ports 144 is connected by line 151 to junction 152 to which lines 153 and 154 are connected. Line 153 has a check valve 155 which permits flow of fluid away from junction 152 and the line 154 has a flow restrictor 156. Both of the lines 153 and 154 terminate in a junction 157 which is connected by line 158 to junction 159 on the hatch covers A and B. Branch lines 161 and 162 are connected at one end to junction 159 and at their other end to ports 71 of one side of the pistons 73 of hydraulic units 61, 62.

The ports 72 of the hydraulic units on the other side of the piston 73 are connected by branch lines 166 and 167 to junctions 168 and these junctions are connected by line 169 to the control port 142 of the selector valves.

The junctions 157 associated with selector valves 124 and 125 are connected respectively by lines 171 and 172 to the ports 174 and 175 of hydraulic units 104. Each of the units 104 desirably comprises a hollow casing, illustratively in vertical position, in which is slidably mounted a pair of pistons 177 and 178. The bottommost piston 177 is spaced from the floor 179 of the casing by an axial projection 181, for example, and the port 175 is positioned between the piston 177 and the floor 179. The piston 178 has an axial rod, rigid therewith extending beyond both sides thereof. The bottommost portion 182 of the rod abuts against the upper end of an axially projecting stud 183 rising from piston 177 and the uppermost portion 105 of the rod extends through an opening in the top wall 185 of the casing and through the linkage previously described is connected to pivoted track section 91.

To ready the system for operation, with selector valves 124 and 125 in neutral position, and with manual valves 116 in open position, the motor M is energized. As a result, fluid under pressure will flow through one-way check valve 114 and line 115 to junction 119 and thence through branch lines 121 and 122 to the ports 123 of the selector valves. As such ports are closed when the valves are in neutral position, the pressure in line 115 will build up to charge the pressure accumulators 117 and 118.

When the accumulators 117 and 118 have charged to a predetermined value, through a conventional cut-off switch (not shown) associated with the pump P, the motor M will be de-energized. The valve 116 associated with accumulator 117 may then be shut off so that the accumulator 117 will be in reserve in the event of power failure and the system is ready for use.

If it is desired to open one of the pairs of hatch covers, i. e., hatch covers A, the selector valve 124, for example, is set to open position.

As a result, the ports 123 and 144 will be connected through annular groove 131 and the ports 143 and 142 will be connected through annular groove 132. Fluid under pressure will flow from accumulator 118 through lines 115 and 121, port 123, annular groove 131, port 144, line 151 to junction 152 and thence through one-way check valve 155 and flow restrictor 156 to junction 157.

The fluid will flow from junction 157, through lines 171 and 172 to inlet port 174 of hydraulic unit 104 and through line 158 to junctions 159 on the hatch cover panels A. From such junctions, fluid will flow through lines 161 and 162 to the ports 71 of the hydraulic actuators 61 and 62.

Considerably greater force is required to move the pistons 73 of the hydraulic actuators to lift the hatch cover panels from closed to open position, than to move the piston 178 in hydraulic unit 104, and the effective area of the pistons of the hydraulic actuators bears such a relation to the effective area of the piston of hydraulic unit 104 that the latter piston will move first to raise the piston rod 105 thereof to pivot the track section 91 from the position shown in Fig. 2 to the position shown in Fig. 3. As a result, both of the panels A–2 and B–2 will be raised slightly at their free ends 40 and by reason of the abutment of blocks 94 on panels A–1, A–2 and B–1, B–2 which will cause the pairs of panels to rotate slightly about their associated pivots 23, the sealing strip 31 will be moved away from the coaming strip 15. As the edge 40 of panel B–2 will move more than the edge 40 of panel A–2, as previously described, and contacting portion 41 and 42 of the sealing strip 131 will move away from each other, as shown in Fig. 3.

As fluid under pressure flows into ports 71 of the hydraulic actuators 61, 62, the pistons 73 thereof will move toward each other with the result that an upward component of force will be exerted against the hinge pin 55 and the two panels A–1 and A–2 will move upwardly from their normal horizontal position until they have reached the substantially vertical position shown in broken lines in Fig. 1. This operation is clearly described in Patent No. 2,491,261 previously referred to. The fluid forced from ports 72 of the hydraulic actuators will flow through lines 166, 167 to junction 168 and thence through line 169, port 142, groove 132, port 143, lines 145 and 148 to reservoir 111.

When the panels A–1 and A–2 have reached fully opened position, the control handle 134 of selector valve 124 is moved to neutral position.

At this time the roller 76 is supported by the raised track section 91 and by reason of the weight of the panel B-2 on said roller, pressure will be exerted against the track section and the piston rod 105 to cause the latter to move downwardly, forcing fluid from the port 174 of the hydraulic unit 104. Such fluid will flow through lines 172 and 171 to junction 157. As the fluid is blocked by check valve 155, it will flow slowly through the flow restrictor 156 into the port 144 of the selector valve 124. As this port is now in communication with discharge port 143 through passageway 133, the fluid in the hydraulic unit 104 will gradually bleed off to the reservoir 111 so that the track section 91 will gradually move downwardly to lower the panel B-2 back onto the coaming. As the result, if heavy cargo should be placed on the panel B-2, there would be no undue stress on the roller 76 which might cause breakage of the latter at its mounting axle 80.

If at this time it is desired to open the panels B-1 and B-2, the selector valve 125 is moved from neutral to open position in the manner previously described, to provide communication between ports 123, 144 and ports 142, 143. As a result, fluid under pressure will flow from the accumulator 118 through the selector valve 125 to the associated junction 157, and from this junction the fluid will flow through lines 171 and 172 to the port 175 of the hydraulic unit 104. As a result of the fluid under pressure flowing into such port, the piston 177 will be lifted to lift the piston 178, thereby causing the piston rod 105 to pivot the track section 91 in the manner previously described to cause the roller 75 on panel B-2 to be lifted, thereby moving the sealing strips on panels B-2, B-1 away from the coaming strip 15 as previously described with respect to panels A-1, A-2.

By reason of the fact that throughout the movement of the piston 177, the volume of fluid between the two pistons 177 and 178 in hydraulic unit 104 remains constant and the entire body of fluid between the two pistons will move upwardly, no pressure block will be created which would restrain movement of the piston 177.

If it is desired to raise both pairs of covers A and B simultaneously, it is merely necessary to move both of the selector valves from neutral to open position at the same time and the operation of the system in such case will be as previously described.

To close one of the pairs of covers, with the other pair in closed position, the control handle of the selector valve 124, for example, is moved from neutral to closed position. As a result, fluid under pressure from accumulator 118 will flow through port 123 of the selector valve, annular groove 131, port 142, line 169 to junctions 168 on the panels A-1, A-2 and thence through lines 166, 167 to the ports 72 of the hydraulic actuators. As a result, the pistons 73 of such actuators will be moved outwardly so that a downward component of force will be exerted against the pivot pin 55, moving the panels toward closed position. As the pistons move outwardly in their associated casings, fluid will also flow from the ports 71 through lines 161, 162 to junctions 159 and from such junctions through line 158 to junction 157. By reason of the check valve 155, fluid will flow relatively slowly through the flow restrictor 156 through port 144 in the selector valve 124, annular groove 129, passageway 133 and port 143 to the reservoir 111. By reason of such restraint of flow caused by the flow restrictor 156, the pressure in the line 158 will build up and consequently fluid under pressure will be forced through lines 171 and 172 into port 174 of the hydraulic unit 104 to lift the piston 178 and the piston rod 105 thereof to move the track section 91 to raised position shown in Fig. 3.

As a result, when the roller 75 carried by the panel A-2 reaches the recess 89 between the adjacent ends of the two tracks 87, 88, it will not drop quickly into such space but will ride along the track section 91.

When the pistons of the hydraulic actuators 61, 62 for the panels A-1, A-2 have moved to their fully closed position, the pressure at junction 157 will gradually fall until it is not sufficient to support the weight of the panel A-2 on roller 75 and the track section 91 will gradually pivot in a clockwise direction under the weight of the panel A-2 on roller 75, gently to deposit the seal 31 of the panel on the coaming strip 15, thereby preventing injury to the hatch cover, the sealing strip or the coaming strip.

If both of the pairs of panels should be in open position, when the associated selector valves are moved to closed position, both of the pistons 177 and 178 will be lifted to raise the track section 91 in the manner previously described to receive both the rollers 75 and 76 to prevent sudden impact.

If only the panels B-2 and B-1 should be open and these panels should be moved to closed position by the actuation of the associated selector valve 125, as previously described, fluid under pressure will be created at the associated junction 157 due to the restrictor 156 and such fluid under pressure will cause the piston 177 to be raised, thereby lifting the piston 178 to pivot the track section 91 upwardly in the manner previously described.

In the embodiment shown in Figs. 6 to 9, two pairs of hatch covers A' and B' are provided, although it is to be understood that more than two pairs could be used. The two pairs of hatch covers designated A' and B', each has two panels A-1, A-2, B-1, B-2, respectively, the panel B-1 being pivotally connected to the adjacent end of the hatchway 12 in the deck of the ship by means of hinge members 201. The adjacent lower edges 202 of the panels of each pair of covers are connected as by means of hinges 203 and the adjacent upper edges of the panels A-2 and B-2 are also connected as by hinges 204. The panels are provided with sealing strips which coact with the supporting strip (not shown) of the coaming of the hatch cover in the manner previously described with respect to the embodiment shown in Figs. 1 to 5.

As shown in Figs. 6 to 9, a track 205 is affixed to the coaming 206 on each of the opposed sides thereof and extends laterally outward therefrom, the track being interrupted as at 207 at the portion thereof adjacent the hinge 204. Positioned in the space 207 is a track section 208 pivotally mounted as at 209 at one end and of length substantially equal to that of the space 207. The track section 208 is actuated by means of a hydraulic unit 211 (Fig. 7) which has a slidable piston 21, thereby controlling a piston rod 198 connected by link 199 to the track section.

Each of the pins 212 of the hinges 204 at their outer ends pivotally mounts a plate 213, preferably triangular as shown, which rotatably mounts at each of its lowermost corners, rollers 214 and 215, the latter being aligned with the track section 208 and the associated track 205. When the hatch covers are in closed position as shown, the rollers 214, 215, will be directly over the track section 208 as shown in Fig. 7.

In addition to the rollers 214 and 215, each corner of the free edge of panel A-1 desirably mounts a roller 216 which, when the panels are in the closed position shown, will rest on a pivoted track section 217 aligned with the associated tracks 205 and actuated by a hydraulic unit 218 similar to hydraulic unit 211. The panels A' and B' are moved from closed to open position and vice versa, by means of hydraulic units 219 and 221 identical to units 61, 62 shown in Fig. 1 and which will not be further described.

Figures 7, 8, 9:
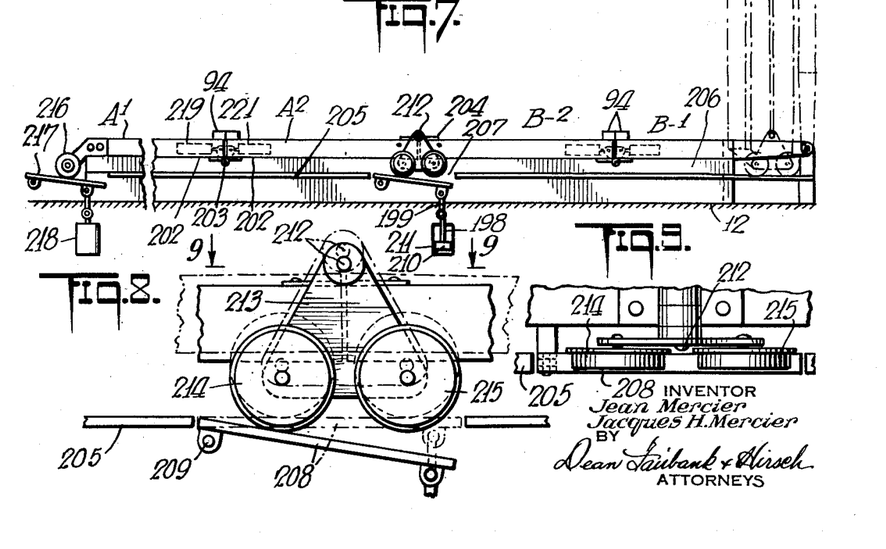
Fig. 7 is a side elevational view of the hatch cover assembly taken along line 7—7 of Fig. 6.
Fig. 8 is a fragmentary detail view on a greatly enlarged scale of the seal breaking mechanism of Figs. 6 and 7.
Fig. 9 is a plan view taken along line 9—9 of Fig. 8.

The system shown in Figs. 6 to 9 is operated by substantially the same hydraulic circuit as that shown in Fig. 10, except that inasmuch as both pairs of covers A and B are operated simultaneously, to be moved to the position shown in broken lines in Fig. 7 when in open position, but a single selector valve is required to operate all of the hydraulic units 219 and 221. The hydraulic units 211, 218 need merely be of conventional single piston type connected in parallel so that they will both operate simultaneously.

Figure 11:
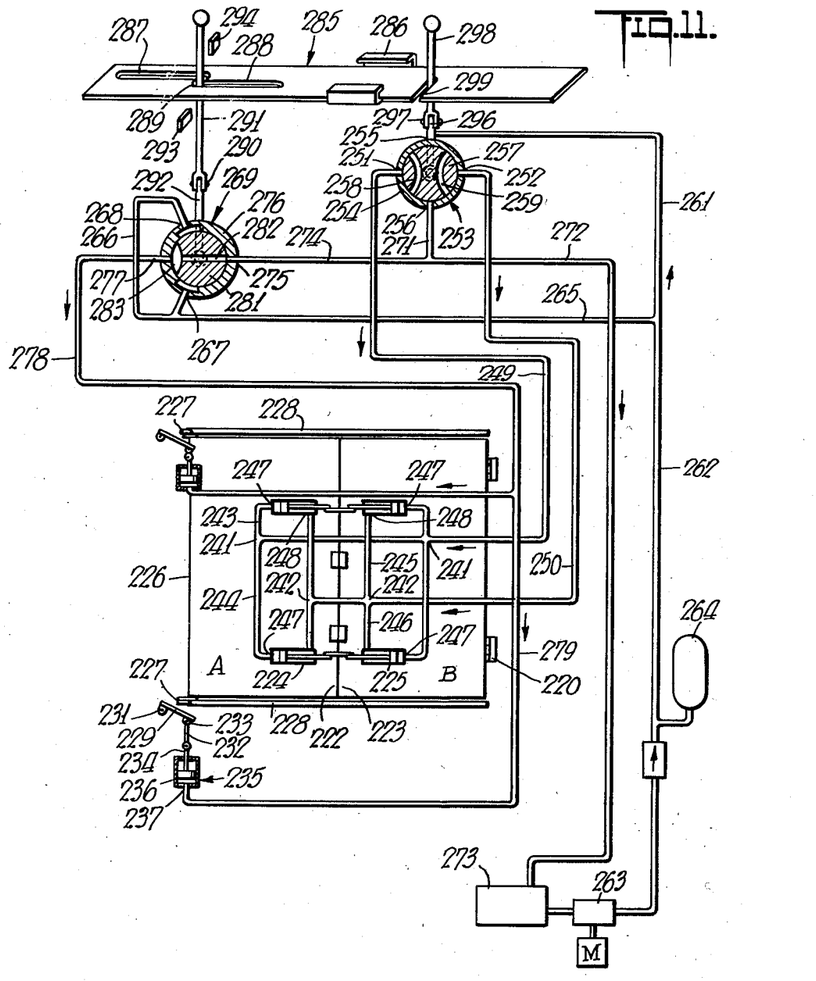
Fig. 11 is a diagrammatic view of still another embodiment of the invention.

In the embodiment shown in Fig. 11, the hatchway of the ship is closed by means of a pair of panels A and B which lie in a horizontal plane when in closed position. The panel B is pivotally mounted to the deck of the ship as at 220 and the panels A and B are hinged together at their adjacent longitudinal edges 222, 223 so that they may be folded to open position by hydraulic actuators 224, 225 in the manner described with respect to the embodiment of Figs. 1 to 5 for example.

As the panels A and B and the associated sealing means and hydraulic actuators are identical to those shown in Figs. 1 to 5, they will not be further described.

The panel A on each end adjacent its free longitudinal edge 226, mounts a roller 227 which is adapted to ride on an associated track 228 and when the panels are in closed position, is positioned over a rail section 229 pivoted at one end as at 231.

A link 232 is pivoted at one end as at 233 to the free end of the rail section 229 and at its other to the end of a piston rod 234 extending from a hydraulic unit 235. The hydraulic unit is of the gravity return type having a piston 236 connected to the piston rod and having a port 237 leading into the unit on the under surface of the piston.

The pivoted rail section 229, the roller 231 and the associated actuating mechanism are identical to the corresponding elements shown in greater detail in Fig. 7.

The junctions 241 and 242 of the panels A and B are connected by branch lines 243, 244 and 245, 246 to ports 247, 248 of hydraulic actuators 224 and 225, and said junctions are connected by lines 249 and 250 to ports 251 and 252 respectively of selector valve 253.

The valve 253 has a casing 254 through which ports 251, 252 and two additional ports 255, 256 extend and has a rotatable valve member 257 which in neutral position closes all of the ports; in one operating position connects ports 251, 256 and ports 252, 255 through passageways 258, 259 in the valve member 257, and in a second operating position connects ports 251, 255 and ports 252, 256 through passageways 258 and 259.

The port 255 is connected by line 261 to main pressure line 262 which is connected to the pump 263 and pressure accumulator 264 and line 261 is also connected by lines 265, 266 to the ports 267, 268 of a selector valve 269. The port 256 of valve 253 is connected by line 271 to return line 272 which leads to the reservoir 273 and by line 274 to the port 275 of selector valve 269. The selector valve 269 has a casing 276 through which ports 267, 268 and 275 extend and has an additional port 277 connected by lines 278, 279 to the ports 237 of hydraulic units 235.

The valve 269 has a rotatable valve member 281 which in the neutral position shown closes ports 267 and 268 and provides communication between ports 275 and 277 through a passageway 282 in said valve member. The valve 269 has two operating positions on each side of its neutral position. On one side of said neutral position, in one of the two operating positions, ports 268 and 275 are closed and ports 267 and 277 are connected by reason of the recess 283 in the valve member 281. In the second of the two positions, the ports 268, 275, 277 would be closed, hence no fluid will flow through port 267. Similarly on the other side of said neutral position, in one of the two operating positions, ports 267 and 275 are closed and ports 268 and 277 are connected by the recess 283. In the second of the latter two portions, the ports 267, 275 and 277 would be closed, hence no fluid will flow through port 268.

Means are provided to insure that the hatch cover panels A and B will not be moved to open or closed position before raising of the track sections 229. To this end, as shown in Fig. 11, an elongated plate 285 is slidably mounted in a suitable support 286. The plate 285 has two transversely displaced longitudinal slots 287 and 288 connected by transverse slot 289. A handle 291 is pivotally connected at its lower end as at 290, to the actuating rod 292 of selector valve 269 and extends through the transverse slot 289 when in neutral position. Suitable stops 293 and 294 are associated with the plate 285 at the inner ends of each of the slots 287, 288 when the plate 285 is in the neutral position shown. Thus the handle 291 may be pivoted about its connection 290 and moved the length of slot 287, or it may be moved the length of slot 288, in both cases without moving the plate 285. Either of such movements of handle 291 will rotate the valve member 281 of valve 269 to the first of the two operating positions on each side of its neutral position.

The valve member 257 of selector valve 253 also has a control rod 296 which is pivotally connected as at 297 to one end of a handle 298 extending through a transverse slot 299 in the plate 285.

The dimensions of the elements are so selected that when the handle 291 of valve 269 is moved to either of its second operating positions on each side of the neutral position, the handle 298 will rotate the valve member 257 of valve 253 to connect ports 251, 256 and 252, 255 or ports 251, 255 and 252, 256.

To open the panels in the system shown in Fig. 11 with the control handle 98 in the neutral position shown, the handle 291 is moved to the right to the end of slot 288. As a result, no motion will be imparted to plate 285, and the ports 268 and 277 of valve 269 will be connected and ports 267 and 275 will be sealed. Fluid will flow through pressure lines 262, 261 to port 255 of valve 253 where it will be blocked, and through lines 262, 265, 266 to port 268 of valve 269 through recess 283, port 277, line 278, 279 to ports 237 of hydraulic units 235 to raise the pistons 236 thereof to pivot the track section 229 upwardly to break the water-tight seal as previously described.

Further movement to the right of handle 291 will cause the plate 285 to slide sufficiently to the right in its mount 286, to move handle 298 so that ports 251, 255 and 252, 256 of valve 253 are in communication. As a result, fluid under pressure will flow from pressure line 261 through port 255, passageway 258, port 251, line 249 to junctions 241 on the panels A and B and thence through branch lines 243 and 244 to ports 247 of the hydraulic actuators to move the panels to closed position as previously described.

Fluid from ports 248 of the actuators will flow through branch lines 245 and 246 to junctions 242 and through line 250, port 252, passageway 259, port 256, line 271 to return line 272 back to the reservoir 273.

After the panels have been opened, the handle 291 can be moved to the neutral position shown, restoring the plate 285 and selector valves 253, 269 to neutral position.

To close the panels A and B, the handle 291 would be moved through transverse slot 289 until it was aligned with longitudinal slot 287. The operation thereafter would be substantially the same as that described to open the covers.

In view of the foregoing, it is apparent that under no conditions of operation will the panels of the hatch cover move from closed to open position without the sealing strip first being raised from the supporting strip so that there is no likelihood of injury to such seals as a result of undue friction and the seals will be long lasting and provide a dependable sealing action. Furthermore by reason of the hydraulic circuits above described, the track section will always be in position to receive the rollers carried by the panels when they are adjacent said track section to prevent sudden impact which might cause injury to the hatch covers.

As many changes could be made in the above equipment, and many apparently widely different embodiments of this invention could be made without departing from the scope of the claims, it is intended that all matter contained in the above description, or shown in the accompanying drawings, shall be interpreted as illustrative and not in a limiting sense.

Having thus described our invention, what we claim as new and desire to secure by Letters Patent of the United States is:

A hydraulic system for actuating a pair of double acting hydraulic units and a single acting hydraulic unit having a cylinder, the cylinder of each double acting unit having a slidable piston and a port on each side of said piston, the cylinder of the single acting unit being in substantially vertical position and having a pair of independent pistons slidable therein, and having a port between one end of the cylinder and the adjacent piston, and a second port between the two pistons, a reservoir, a pump, a motor to drive the pump to force fluid from said reservoir, a pair of selector valves each having an inlet port connected to the output of said pump, a discharge port connected to said reservoir, and a pair of control ports, an associated line connecting one of the control ports of each valve to one of the ports of the associated double acting hydraulic unit, and an associated line connecting the other control port of each of the valves to the other port of the associated double acting hydraulic unit, a parallel circuit in each of the lines to the first control port, each of said parallel circuits having a pair of lines, one of said lines having a one-way valve to permit flow of fluid therethrough from said control port and the other line of said pair having a flow restrictor, and an associated line from each of said lines from the first control port connected at one end between the parallel circuit and the associated port of the double acting hydraulic unit and at its other end to one of the ports of said single acting hydraulic unit, the effective area of the piston of the double acting unit bearing such a relationship to the effective area of the piston of the single acting unit that the latter unit will operate before the former.

References Cited in the file of this patent
UNITED STATES PATENTS

| | | |
|---|---|---|
| 934,456 | McGray | Sept. 21, 1909 |
| 941,426 | Loudon | Nov. 30, 1909 |
| 2,151,057 | Suth | Mar. 21, 1939 |
| 2,186,235 | Brown | Jan. 9, 1940 |
| 2,256,087 | Hay | Sept. 16, 1941 |
| 2,285,604 | Mercier | June 9, 1942 |
| 2,491,261 | Greer et al. | Dec. 13, 1949 |
| 2,595,248 | Greer et al. | May 6, 1952 |
| 2,622,400 | Greer | Dec. 23, 1952 |
| 2,627,835 | Mege | Feb. 10, 1953 |
| 2,635,430 | Hodges et al. | Apr. 21, 1953 |